United States Patent [19]

Meaney

[11] Patent Number: 5,784,383
[45] Date of Patent: Jul. 21, 1998

[54] APPARATUS FOR IDENTIFYING SMP BUS TRANSFER ERRORS

[75] Inventor: Patrick James Meaney, Poughkeepsie, N.Y.

[73] Assignee: International Business Machines Corporation, Armonk, N.Y.

[21] Appl. No.: 942,816

[22] Filed: Oct. 2, 1997

[51] Int. Cl.[6] ................................................ G06F 11/00
[52] U.S. Cl. ................................................ 371/22.4
[58] Field of Search ............................. 371/22.4, 22.5, 371/22.6, 36; 395/182.09, 182.1, 183.06, 185.09, 800.28

[56] References Cited

U.S. PATENT DOCUMENTS 5,671,430  9/1997  Gunzinger ...................... 395/800
5,727,209  3/1998  Swingwine et al. ............ 395/672

Primary Examiner—Vincent P. Canney
Attorney, Agent, or Firm—Lynn L. Augspurger

[57] ABSTRACT

In an SMP computer system where data is partitioned across one or more chips a circuit and method permits detecting errors across chip boundaries due to a control error even though the ECC is not bad. A Multiple-input Shift-Register (MISR) on each bus is used to collect a dynamic signature representing all the critical buses on each chip that need to be compared. The MISR state combines present and previous states of these buses, so the MISR will be different if one or more bus controls break. Since an N-bit MISR shifts, comparing a single bit of the MISR each cycle guarantees detection within N cycles of a problem. The method for identifying errors includes accumulating bus signature information which is a function of current and previous values of an input bus and then comparing portions of the signatures of two or more input bus structures to determine sync of buses. Part of the signature is wrapped around into the signature to cause past information to be maintained indefinitely. Additional logic is introduced, including mask logic, programmable feedback, and counters along with a method for isolating defects using these features.

12 Claims, 2 Drawing Sheets

APPARATUS FOR IDENTIFYING SMP BUS TRANSFER ERRORS

FIELD OF THE INVENTION

This invention relates to symmetrical computer systems, and particularly to an apparatus for comparing synchronous chips for sequence failures of symmetrical multiprocessors (SMPs) for identifying SMP bus transfer errors.

BACKGROUND OF THE INVENTION

In an SMP Computer System data may be partitioned across one or more chips. For instance, on planned future systems being developed, the computer system has Quadword data buses between the system controller SC and the central processor functional units CPs. For a given SC, the Quadword is partitioned into two chips, each with a doubleword. Each doubleword has ECC protection across it.

The problem is that the data may get corrupted due to a control error without causing the ECC to be bad. For instance, if one dataflow chip had a defect that caused it to send a doubleword from an incorrect source, the data will still have good ECC. Therefore, the problem would go undetected. In past tries to provide a solution to this problem, cross-checking was usually performed using a prior art parity generation and compare circuit as illustrated by FIG. 1. The problem with this is that it only detects single-bit or odd-number-bit failures in the control words. With control problems, often more than one bit can mismatch (e.g. A bad decode will cause one signal to come on while another will turn off). To do any more extensive compare (like a full bus compare) would require a great deal of chip I/O. In planned systems (and most systems in the SMP industry) this is not feasible.

SUMMARY OF THE INVENTION

In accordance with the preferred embodiment of the invention, a Multiple-input Shift-Register (MISR) is provided on each chip to collect a dynamic signature representing all the critical signals that need to be compared. Since the state of the MISR is a combination of the present state of these buses in addition to previous states, it is very likely that the MISR will be different if one or more bus controls break. Since a 60(N)-bit MISR will shift in addition to its calculation, comparing a single bit of the MISR each cycle will guarantee detection of most defects within 60(N) cycles of a problem. The invention needs up to two additional I/O per chip and so uses less chip I/O.

The improvements of the invention permit later adding more signals to monitor without introducing a timing problem or I/O change. The only requirement is that the inputs to the invention on both chips should always be identical.

In accordance with the preferred embodiment, the invention provides a MASK feature that can be used to block signals that should not be compared. This MASK feature can also be used to isolate a defect (e.g. by blocking ALL signals from the MISR and allowing one signal at a time into the MISR until a mismatch occurs). It can also be used to block certain control bits on both chips that are known to differ (either permanently or for a brief period of time) so the invention does not falsely report an error.

The invention also includes circuitry to detect single-bit errors sooner as well as to determine exactly which single-bit failed.

These and other improvements are set forth in the following detailed description. For a better understanding of the invention with advantages and features, refer to the description and to the drawings.

BRIEF DESCRIPTION OF THE DRAWINGS

FIG. 1 shows prior art parity compare logic; while

FIG. 2 shows, schematically, an overview of the preferred embodiment of the MISR compare logic with masking of inputs by mask bus mask logic, history switch, parity generation and compare logic, and counter that can be used to isolate single-bit control errors; while

The detailed description explains the preferred embodiments of the invention, together with advantages and features, by way of example with reference to the following drawings.

Figure 1:
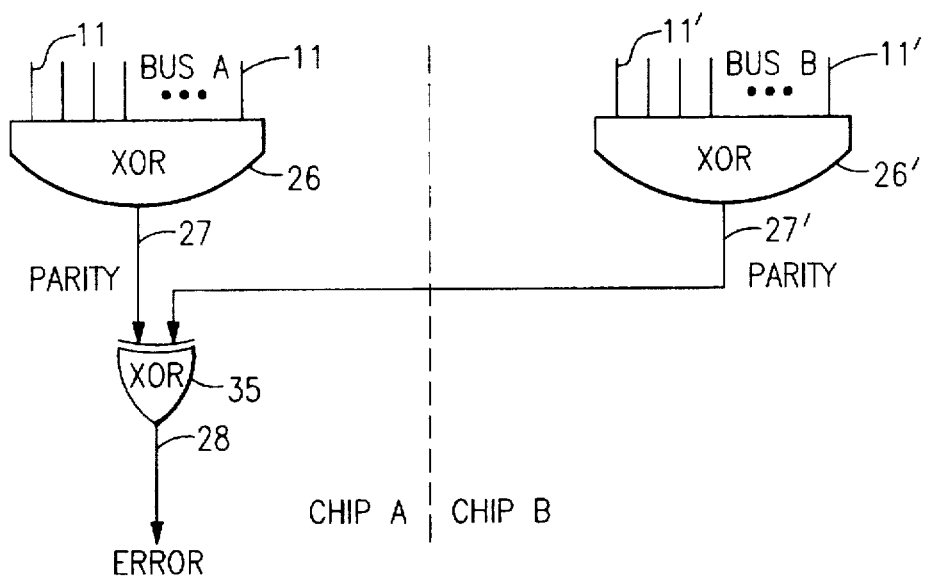

DETAILED DESCRIPTION OF THE INVENTION:

Turning to FIG. 1, notice that the prior art contains:

Two chips or regions of design, A, and B, each containing a control bus, 11 and 11', Exclusive-OR (XOR) logic or Parity generators, 26 and 26', and Exchange and compare of these parities, 27, 27', 35, and 28.

Figure 2:
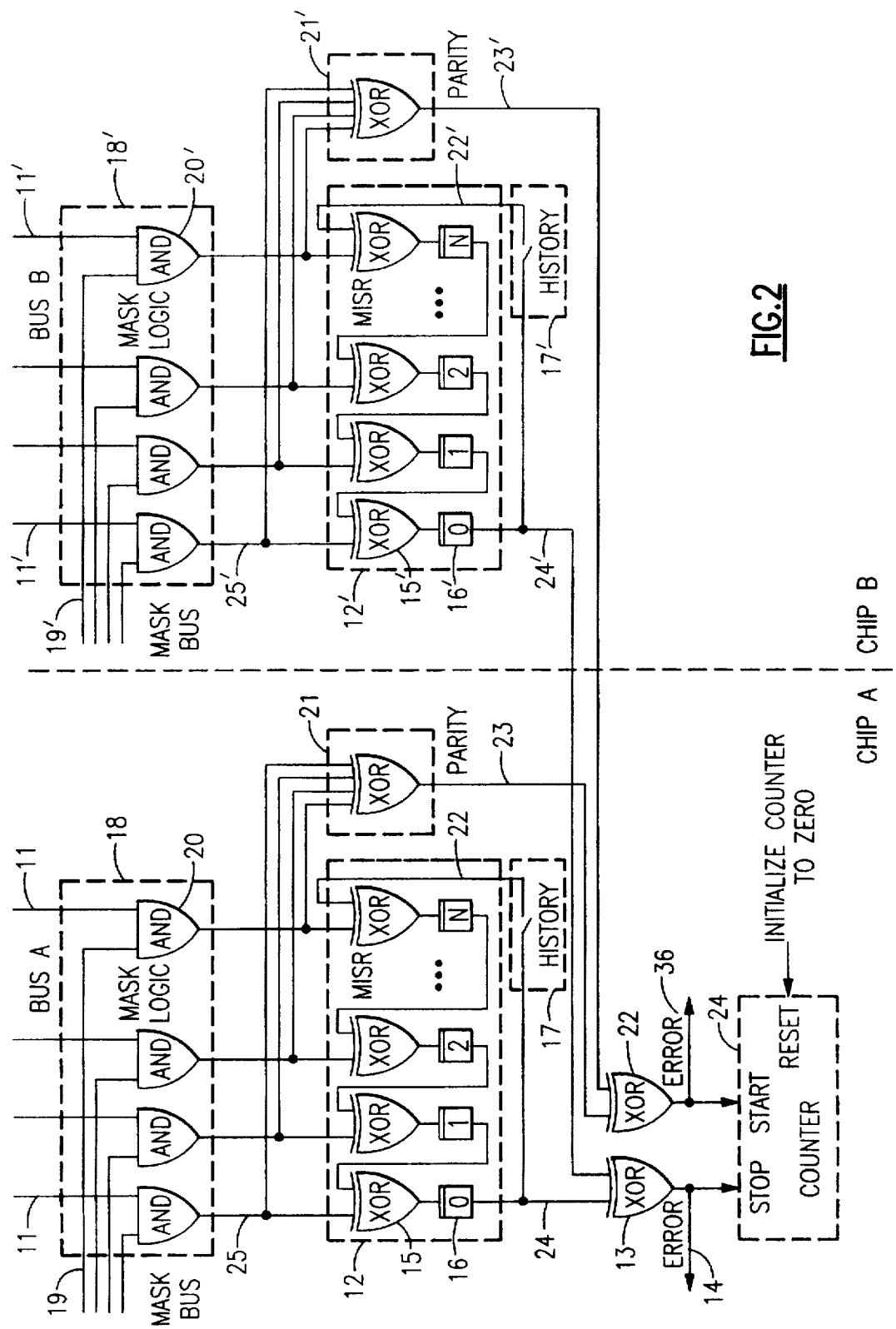

In contrast in FIG. 2, notice that the invention contains:

Two chips or regions of design, A, and B, each containing a control bus, 11 and 11', A multiple-input-shift-resister (MISR) to collect bus information into a dynamic signature, 12 and 12', Exchange and compare of the MISR information, 24, 24', 13, and 14, A programmable history switch, 17, An exclusive-OR (XOR) or Parity generator, 21 and 21', Exchange and compare of these parities, 23, 23', 22, and 36, A counter to help isolate defects, 24, Mask logic to block inputs from the bus, 18 and 18', As well as process steps to use the invention.

Now, turning to FIG. 1, the goal is to compare the control and/or data signals within Bus A and Bus B, 11 and 11', to determine if the two chips get out of synchronization. In the prior art, this would have been done with an XOR gate (parity generator), 26, connected to the bits of the control bus, 11, on each chip, such bits being signals which should match on the multiple chips. These output XOR signals, 27 and 27', are then exchanged between the two chips and compared using an XOR, 35, to determine if a mismatch in parities has occurred, indicated by error, 28. With control problems, often more than one bit can mismatch (e.g. A bad decode may cause one signal to come on while another will turn off). This type of error would go undetected by the prior art, as illustrated below. To do any more extensive compare (like a full bus compare) would require a great deal of chip I/O. In planned systems (and most systems in the SMP industry) this is not feasible.

For example, consider the Bus A and Bus B sequences and their effect on the prior art parity and checking logic, as shown in TABLE 1.

TABLE 1

| Cyc | BUS A | BUS B | A Pty | B Pty | Error? |
|---|---|---|---|---|---|
| 1 | 00000000 | 00000000 | 0 | 0 | 0 |
| 2 | 00000000 | 00000000 | 0 | 0 | 0 |
| 3 | 00000000 | 00000000 | 0 | 0 | 0 |
| 4 | 00100110 | 00100110 | 1 | 1 | 0 |
| 5 | 01110100 | 01101100 | 0 | 0 | 0 |
| 6 | 10100010 | 10100010 | 1 | 1 | 0 |

Notice that the chips are completely synchronous until cycle 5, when they differ by two bits. Generating EVEN parity (XOR) of the critical buses yield the same parity on both chips. Therefore, the failure would go undetected.

However, in accordance with the invention, illustrated in FIG. 2, the control and/or data signals in Bus A and Bus B, 11 and 11', are each connected to a Multiple-input Shift Register (MISR), 12 and 12', (to compress current and future states into a signature) via mask logic, 18 and 18'. One or more output bits of said MISR, 24 and 24', connect to the input of compare logic, 13, to generate error indication, 14. Notice in FIG. 2 that each bit of the MISR (e.g. i), is connected such that its value on the next cycle will be the XOR of bit i of the incoming bus and MISR Latch bit i+1. The MISR can be made from Latches, 16, and input XOR logic, 15.

Using the same example in TABLE 1, TABLE 2 shows the MISR results on each chip due to the above pattern (assuming the shift-in of the MISR is logically tied to '0' and that there is a cycle lag between the input buses and the MISR register outputs).

TABLE 2

| Cyc | MISR A | MISR B | MISRA(0) | MISRB(0) | Error? |
|---|---|---|---|---|---|
| 2 | 00000000 | 00000000 | 0 | 0 | 0 |
| 3 | 00000000 | 00000000 | 0 | 0 | 0 |
| 4 | 00000000 | 00000000 | 0 | 0 | 0 |
| 5 | 00100110 | 00100110 | 0 | 0 | 0 |
| 6 | 00111000 | 00100000 | 0 | 0 | 0 |
| 7 | 11010010 | 11100010 | 1 | 1 | 0 |
| 8 | 10100100 | 11000100 | 1 | 1 | 0 |
| 9 | 01001000 | 10001000 | 0 | 1 | 1 |
| 10 | 10010000 | 00010000 | 1 | 0 | 1 |
| 11 | 00100000 | 00100000 | 0 | 0 | 0 |

Notice that even though the bus defect occurred on only one cycle, cycle 5, the MISRs continued to differ through cycle 10.

With a MISR in a dynamic environment for detection, the only requirement is that two pieces of hardware, a MISR for each bus, need to monitor signals that are always supposed to be identical and in synchronization in an SMP machine.

In accordance with the preferred embodiment, a programmable history switch, 17 and 17', is provided as shown in FIG. 2, for keeping history of bus mismatches indefinitely by coupling output left-most MISR bit 0, signal 24, to input right-most MISR bit n, signal 22.

Once the defect is propagated out of the first bit, the history of the defect is normally lost. The preferred embodiment has a programmable history switch, shown in FIG. 2. Setting this switch would cause the MISR shift output, bit 0, to be shifted back into the MISR, bit n. This would allow a defect which occurred at any time to remain in the signature indefinitely. This would be useful if an application of the invention did not stop clocks but could be used to indicate if there was ever a mismatch between the buses. Although it is possible for defects to cancel each other out and cause matching final signatures, it is highly unlikely.

In accordance with the preferred embodiment, shown in FIG. 2, the invention provides for a multiplicity of parity generators (XORs), 21 and 21', on the Bus bits, exchange of these parities, 23 and 23', and compare logic, 22, to detect single-bit and odd-number-of-bit failures, 26. This is similar to the prior art, shown in FIG. 1, and would provide for a fast detection of this class of failures.

In accordance with the preferred embodiment, a cycle counter, 24, is provided as shown in FIG. 2.

This cycle counter starts when the parities mismatch, and the cycle counter stops when the MISR shift-out compares. The count will point to the position in the bus of the failing bit, in the case of a single-bit failure. The count will be zero in the case of an even-bit failure. When bit 0 of the control bus fails, the counter counts to '1', indicating that the first bit in the MISR failed and there was a single- bit failure. There may be cases where multiple-bit failures cause the counter to be incorrect, but more elaborate logic can be added to allow for the counter to only count the first event and never re-count. One skilled in the art could easily accomplish this.

In accordance with the preferred embodiment as shown in FIG. 2, the invention provides mask logic, 18, which consists of a multiplicity of AND gates, 20, for masking one or more bits from the control bus, 11 and 11', onto output bus, 25 and 25', using mask bus, 19 and 19'.

There are times when it may be necessary to ignore some of the control bits from the MISR and Parity calculations. For example, the system may have an asynchronous transfer operation which can load one chip (using Bus A controls) while the other chip does nothing (Bus B controls are not being used). The corresponding bus inputs need to be blocked from all MISRs and Parity calculations so the operation is not falsely interpreted as a mismatch. To do this, the corresponding mask bits of the mask bus would be forced to '0' (default is to supply '1').

Another use of the mask function is for detect isolation. Assume a single defect exists which causes an error to show up. If the failure is reproducible, the mask bits can be set to block half the input bits from the MISR and Parity generation. If the failure goes away, the defect must be one of the bits that was blocked. If the error still shows up, the defect must be one of the previously unblocked bits. The mask bits can then be set to block half of the remaining bits to further isolate the defect. This binary search can continue until the single control bit is found.

If there were more than one defect, the test could be repeated by 'marching' the masks such that all but 1 bit would be blocked from the invention logic. Each error that come up will indicate that that corresponding control bit is defective. The bits that pass are without defect.

A third use of the masks is for design debug, even if a chip is not defective. Assume it is necessary to stop the machine when a particular select bit first turned on (e.g. loading a key register with a LOAD signal). By setting the mask bit to '0' corresponding to that LOAD signal for only ONE chip, a compare error will occur when that LOAD signal goes to a '1' because the signal on the unblocked chip will enter the MISR and Parity generation logic with a value of '1', while the blocked chip will use a '0'. This same principle can be applied to more bits, including the entire bus, by applying all the relevant masks to only one chip.

Figure 3:
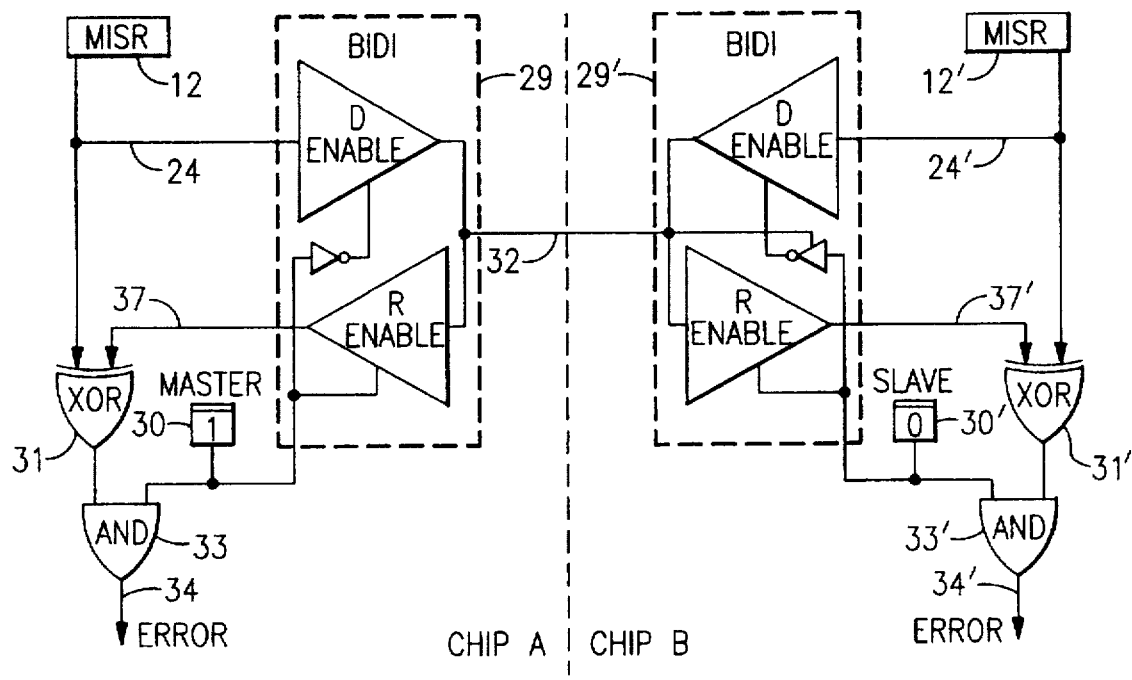
FIG. 3 shows details of the switchable bidi configuration for reducing chip I/O requirements for identical symmetrical chip design with compare logic and bidi enable logic to allow a single chip I/O pin to be used on each chip with programmable master/slave direction bit, rather than using a driver and receiver chip I/O per chip.

In the preferred embodiment, one of the chips is treated as the master which does the checking while the other is a slave which sends MISR and Parity information to the master, as shown in FIG. 3. A Latch, 30 or 30', is set to logical '1' for the master chip and is set to '0' for the slave chip. Both chips contain Bidi Logic, 29 and 29', which either transfers values from input bus, 24 or 24', onto common bidi bus, 32, or transfers values from common bidi bus, 32, onto input bus, 37 or 37'. Each chip also contains XOR compare logic, 31, which represents either MISR Compare logic, 13, or Parity Compare logic, 22, shown in FIG. 2. The AND Circuit, 33 and 33', is used to block output checker results, 34 or 34', for the slave chip while allowing the check to be valid for the master chip. This allows for identical chips to be designed without having to double the I/O bits used for exchanging the compare information.

Thus in an SMP where data is partitioned across chips, this method for identifying errors includes the steps of: accumulating bus signature information which is a function of current and previous values of an input bus (e.g. using MISR), and then comparing (or sharing) portions of the signature information from two or more input bus structures to determine if the two or more buses are in synchronization.

Because part of the signature can be wrapped back around into the signature this causes past information to be maintained indefinitely.

It will be noted the process also includes a step of forming a parity signal and comparing parity signals of the two or more buses.

Further, the process includes counting the number of cycles from when the parities mismatch to when the signature information mismatches. The result of this count will indicate which single-bit in the corresponding input buses mismatched.

The preferred process also includes a step of blocking some of the bus inputs to the respective MISRs, thereby ignoring some bits from the compare calculations. These would also have to be blocked from the parity calculations. This can be done permanently or dynamically (to avoid erroneous compare errors during abnormal operations when the chips are not exactly in sync).

The preferred process also includes a step of blocking some of the bus inputs to the respective MISRs during defect isolation, using binary search, marching, etc. to locate the defect(s).

The preferred process also includes a step of blocking some of the bus inputs to only one chip MISR and/or Parity logic to cause a desirable error interrupt when a particular signal first switches.

Another way to use this invention in a hierarchical memory with the SMP is within an L2 or cache chip. The 72 bits of data on the chip get routed through two parallel bitstacks (36 bits each). Although the controls for the routing are supposed to be identical, defects could cause them to be different. By feeding the control signals into a MISR (one per bitstack), one or more of the MISR bits can be compared to the corresponding bits of the other bitstack to detect the defect. Therefore, the invention does not only apply to separate chips, but also applies generically to different regions of a system.

In addition to using this for detection, it can also be used for isolation of a defect. For instance, in FIG. 1, bits 0 of the two MISRs are compared. As shown in Table 3, if they mismatch on cycle x, it means one of the following has occurred (assuming only one defect):

TABLE 3

| Cycle | Defect |
|---|---|
| x | No status |
| x − 1 | ABUS and BBUS mismatched in bit 0 |
| x − 2 | ABUS and BBUS mismatched in bit 1 |
| x − 3 | ABUS and BBUS mismatched in bit 2 |
| x − 4 | ABUS and BBUS mismatched in bit 3 |
| x − n | ABUS and BBUS mismatched in bit n − 1 |
| x − n − 1 | ABUS and BBUS mismatched in bit n |

For additional isolation, an existing structure known as a trace array (used to collect history of critical signals during the last cycles of the machine before an error occurs) may be used. Both the MISR Compare and the Parity Compare get sent to the trace array. For odd-number-of-bit failures, the time between the two error indications determines where the defect occurred. This is very similar to the use of the counter described earlier.

Although the preferred embodiments have been described in detail herein, it is understood that those skilled in the art, both now and in the future, may make various improvements, modifications, additions, and substitutions without departing from the spirit of the invention and these are therefore considered to be within the scope of the claims which follow. These claims should be construed to maintain the proper protection for the invention first disclosed.

What is claimed is:

1. In an SMP computer system with two or more identical, synchronous control buses, an apparatus for detecting errors comprising, a multiple-input shift-register (MISR) on each bus for collecting as an input to said MISR a dynamic signature representing past and present states of the signals in the bus, and compare logic for comparing one or more bits of output from each MISR to detect a mismatch in the bus control signals.

2. In an SMP computer according to claim 1, wherein said dynamic signature differs and does not match when one or more bus controls break.

3. In an SMP computer according to claim 1, wherein said MISR comprises latches and exclusive-or logic for providing a latch bit, and each latch bit (i) is generated as the logical exclusive-or of input bit (i) and latch output bit (i+1).

4. In an SMP computer according to claim 1, wherein said compare logic uses exclusive-or logic.

5. In an SMP computer according to claim 1, wherein is provided a feedback path switch which couples a MISR shift output to said MISR shift register as an input, thereby allowing the accumulation of failures for an unlimited time.

6. In an SMP computer according to claim 5, wherein said feedback path switch is programmable.

7. In an SMP computer according to claim 1, further including a parity generator connected to each control bus and compare logic to compare the parities of said control buses.

8. In an SMP computer according to claim 7, wherein said parity generator is comprised of exclusive-or logic.

9. In an SMP computer according to claim 7, wherein said compare logic is comprised of exclusive-or logic.

10. In a multi-chip SMP computer according to claim 7, further including a cycle counter, said cycle counter starting to count when the parities of said control buses mismatch and stopping when the MISR shift-outs compare, said cycle counter pointing to the position in the bus of the failing bit, in the case of a single-bit failure.

11. An apparatus for detecting errors in an SMP computer according to claim 1, further including mask register and blocking logic used to selectively block one or more bits from entering said MISR.

12. An apparatus for detecting errors in an SMP computer according to claim 11, wherein said blocking logic is comprised of AND circuitry.

* * * * *